United States Patent [19]
Langenbeck

[11] Patent Number: 5,715,931
[45] Date of Patent: Feb. 10, 1998

[54] CONVEYOR APPARATUS

[76] Inventor: Keith A. Langenbeck, 4317 Greenbrier Dr., Dallas, Tex. 75225

[21] Appl. No.: 401,879

[22] Filed: Mar. 10, 1995

[51] Int. Cl.$^6$ ................................ B65G 21/00
[52] U.S. Cl. ..................... 198/860.2; 198/860.1
[58] Field of Search ............... 198/860.1, 860.2, 198/861.1, 836.1, 837

[56] References Cited

U.S. PATENT DOCUMENTS

| | | | |
|---|---|---|---|
| 3,491,873 | 1/1970 | Fauth | 198/836.1 |
| 3,621,986 | 11/1971 | Webb et al. | 198/837 X |
| 3,848,732 | 11/1974 | Catalano | 198/836.1 |
| 4,934,516 | 6/1990 | Dugan | 198/860.2 X |
| 5,178,263 | 1/1993 | Kempen | 198/861.1 X |
| 5,186,314 | 2/1993 | Clopton | 198/860.1 X |
| 5,361,892 | 11/1994 | Hamaker et al. | 198/837 X |

FOREIGN PATENT DOCUMENTS

| | | | |
|---|---|---|---|
| 0963416 | 2/1975 | Canada | 198/860.2 |
| 2446783 | 8/1980 | France | 198/860.1 |
| 2636052 | 3/1990 | France | 198/861.1 |

*Primary Examiner*—James R. Bidwell
*Attorney, Agent, or Firm*—Michael E. Martin; W. Kirk McCord

[57] ABSTRACT

Article transport conveyors, particularly for the food and beverage processing industry are characterized by interconnected conveyor frame sections having two rectangular cross section tube or angle member longitudinal beams spaced apart from each other and connected by plural transverse channel-shaped beam members. The transverse beams are mounted above the longitudinal beam members and support longitudinal parallel guide and support rails for one or more endless conveyor flights. The transverse beams also support upstanding brackets for parallel longitudinal guide rails for guiding articles being conveyed by the conveyor flights and spaced apart depending brackets for supporting return runs of the conveyor flights on return run support rollers. The frame sections are supported by spaced apart tubular column members which are connected to the frame sections at respective adjacent ends thereof by connectors having opposed arms interconnected by a web or opposed flanges which may be secured by threaded fasteners to the beam and column members of each section. The frame is mechanically uncomplicated and permits easy access to the conveyor for cleaning and replacement or repair of the chain links, the guide and support rails, and the return run rollers.

21 Claims, 4 Drawing Sheets

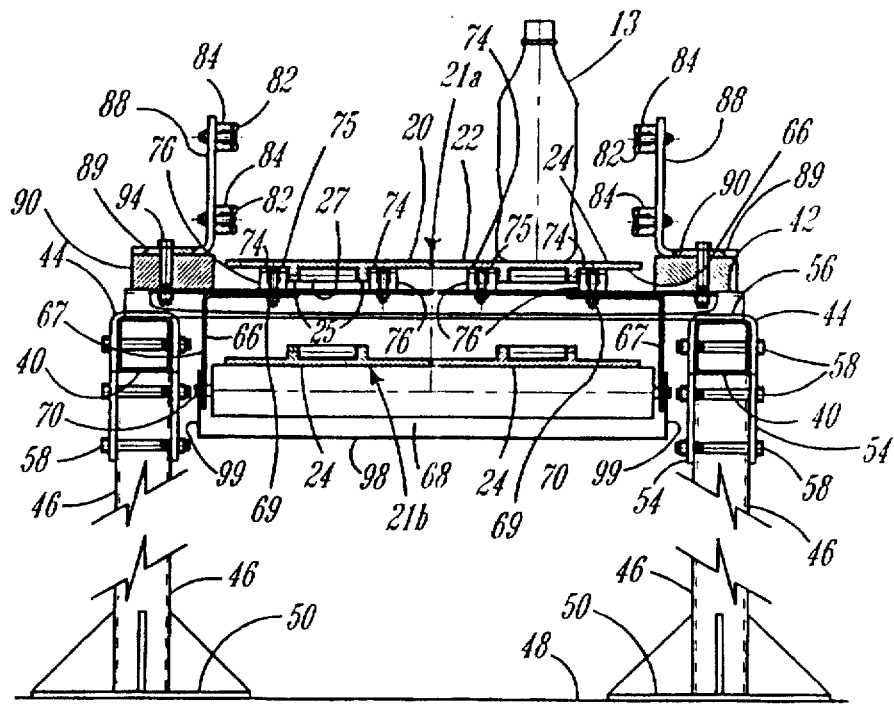
Fig. 3
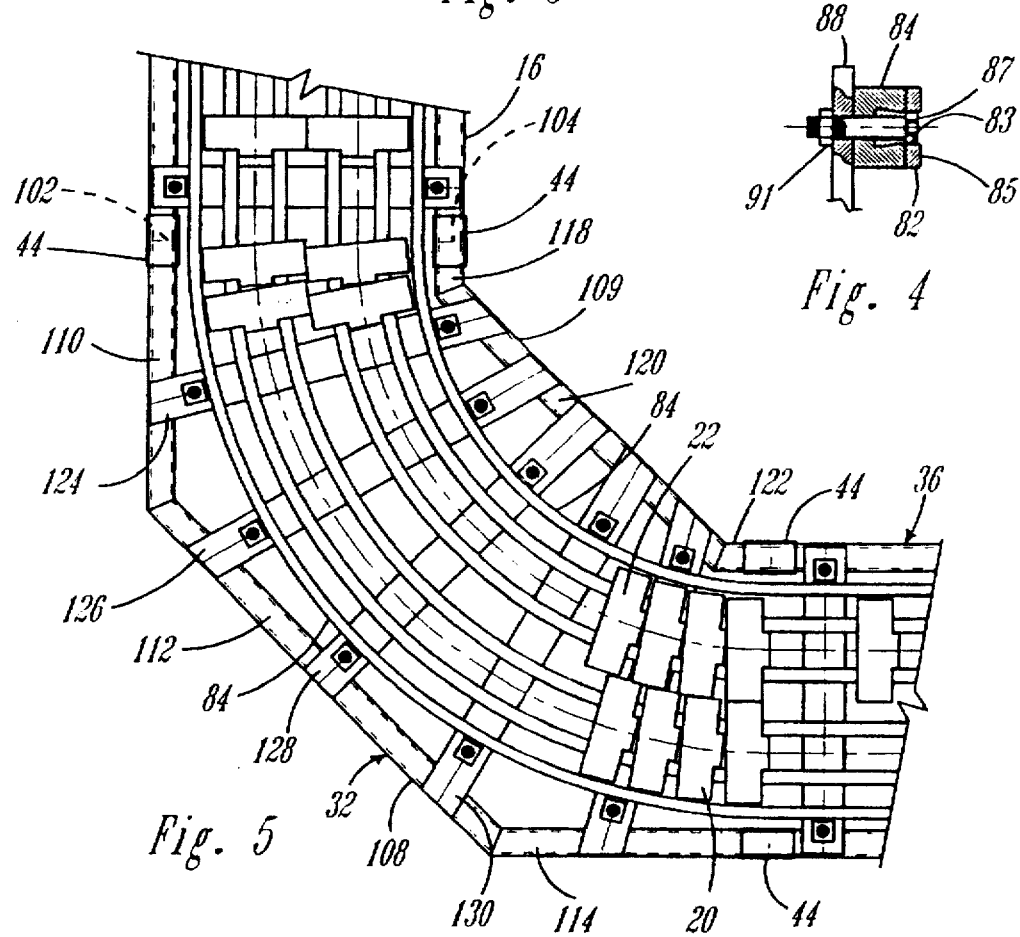
Fig. 4
Fig. 5

CONVEYOR APPARATUS

FIELD OF THE INVENTION

The present invention pertains to conveyor apparatus including, in particular, a support frame for an endless tabletop-type conveyor chain.

BACKGROUND OF THE INVENTION

Material and article handling conveyors are widely used in the production, transport and storage of various materials and goods. The food and beverage manufacturing industry, for example, employs many so-called tabletop type conveyors for transporting food and beverage containers from one processing station to another or from a final processing station to a packaging and storage area. Tabletop conveyors, in particular, desirably have a minimum amount of or an arrangement of support structure so that cleaning and contamination problems are minimized and so that easy access to the conveyor chain or chain flights is available for cleaning, replacement or repair. Moreover, it is desirable to be able to move these types of conveyors from time to time as material flow through a manufacturing plant is modified for one purpose or another.

Accordingly, there has been a continuing need to improve the support structure for endless conveyor chain flights, particularly for so-called tabletop-type conveyors such as used in the food and beverage processing and transport industries. It is to these ends that the present invention has been developed.

SUMMARY OF THE INVENTION

The present invention provides an improved conveyor, particularly of a type utilizing endless flights made up of interconnected chain links. In accordance with one important aspect of the invention, a conveyor apparatus is provided having a support frame which is made up of elongated longitudinal beams and transverse beam members which are mounted above the longitudinal beam members in an arrangement which provides improved access for cleaning and repair of article transport conveyor chain flights in both the article transport run and the return run of the chain flights.

In accordance with another important aspect of the invention, an improved conveyor is provided having a support frame which is made up of elongated spaced-apart longitudinal support beams which are formed of rectangular metal tubing. The tubular beams are interconnected by transverse beam members which are preferably formed of metal channel shaped members. The tubular beams are also adapted to be supported by unique connectors having support column members connected thereto and which may be easily assembled and disassembled to provide a modular arrangement of the conveyor support frame.

An alternate embodiment of the support frame includes longitudinal beams which are formed of angle or L-shaped members having the transverse beam members mounted thereabove also to provide better access to the conveyor flights for cleaning and repair thereof.

In accordance with still another aspect of the present invention, a tabletop-type conveyor is provided for use in the beverage and food processing industry which is made up of a lightweight frame which is mechanically uncomplicated. Thanks to the provision of an uncomplicated frame made up of elongated spaced-apart tube or angle members which are interconnected by spaced-apart transverse channel members, straight sections of the frame are easily fabricated and provided in modular form, and unique corner or curved sections of conveyor are also provided by the improved frame construction.

In accordance with yet a further aspect of the present invention, a conveyor support frame is provided which is easily fabricated in modular units for arrangement in particular configurations as desired, and which frame units are interconnected by a unique support column and bracket or connector which, in combination, provides an uncomplicated and effective manner of supporting the conveyor frame sections.

Those skilled in the art will recognize and further appreciate the above-mentioned features as well as other superior aspects of the present invention upon reading the detailed description which follows.

BRIEF DESCRIPTION OF THE DRAWING

FIG. 3 is a section view taken generally from the line 3—3 of FIG. 2;

FIG. 4 is a detail view showing a typical connection between one of the conveyor guide rails and its support member;

FIG. 5 is a detail plan view of one of the corner sections of the conveyor of the present invention;

DESCRIPTION OF PREFERRED EMBODIMENTS

Figure 1:
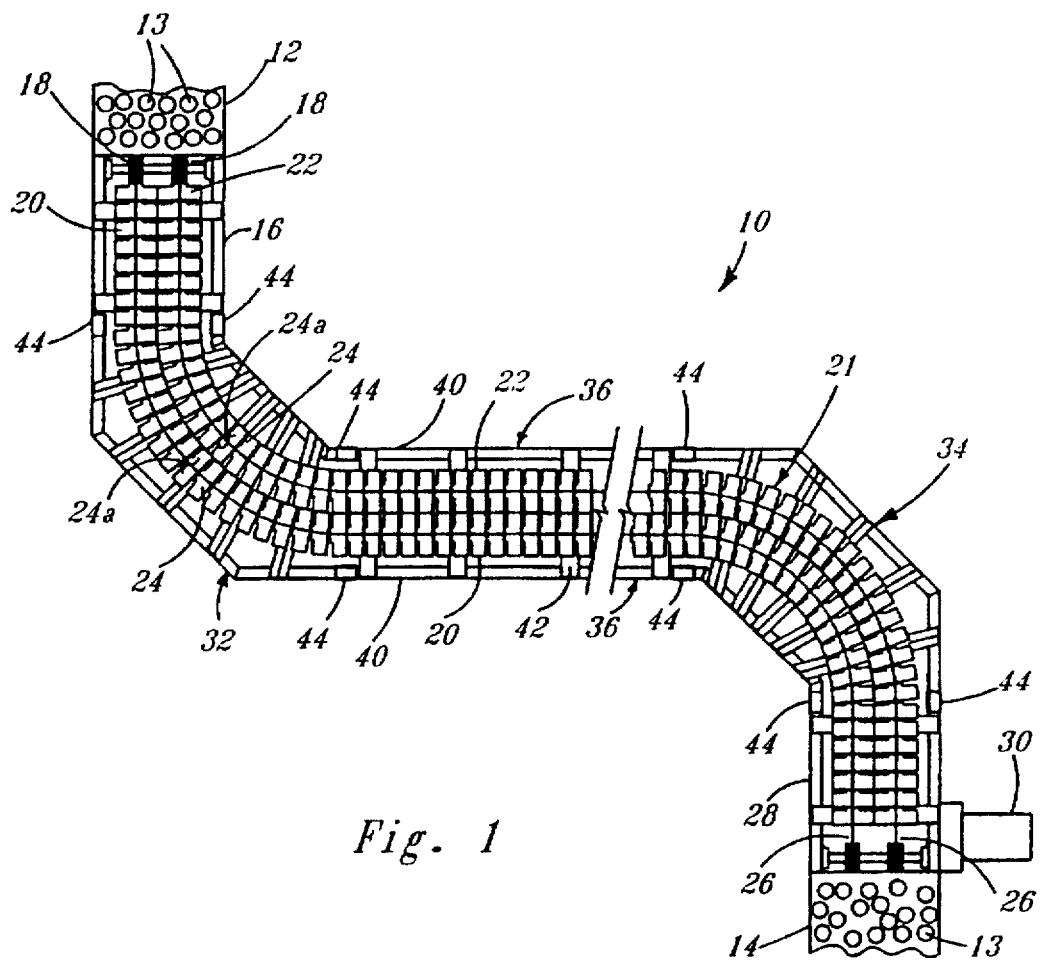
FIG. 1 is a plan view of an endless tabletop type conveyor in accordance with the present invention.

In the description which follows, like parts are marked throughout the specification and drawing with the same reference numerals, respectively. The drawing figures are not necessarily to scale and certain conventional features may be shown in somewhat generalized or schematic form in the interest of clarity and conciseness. In some instances mechanical fasteners are shown in full rather than in hidden lines to better illustrate their location.

Referring to FIG. 1, there is illustrated a unique article transport conveyor in accordance with the invention and generally designated by the numeral 10. The conveyor 10, by way of example, may be of a type suitable for transporting beverage containers from a container filling apparatus 12 to a container packaging apparatus 14, for example. The conveyor 10 is made up of plural sections of support frame interconnecting the filling apparatus 12 with the packaging apparatus 14, including a linear section 16 having a pair of idler sprockets 18, rotatably disposed thereon and operable to support parallel flights 20 and 22 of endless conveyor chain of the so-called tabletop type. The chain flights 20 and 22 are characterized by interconnected chain links 24 having a flat, article support deck 24a. The chain links 24 may be of a type commercially available. For example, one source of tabletop-type chain links is the Rexnord Corporation including their series 880 and 880TAB plastic tabletop chains. The endless chain flights 20 and 22 are supported for traversal between the idler sprockets 18 and suitable drive sprocket means 26 supported for rotation on a second section of support frame designated by the numeral 28 and disposed at the opposite end of the conveyor 10. The drive sprockets 26 are suitably drivably connected to a conventional drive motor 30. The conveyor frame sections 16 and 28 are interconnected by at least two corner frame sections 32 and 34, which may be of substantially identical construction, and plural straight frame sections 36 of predetermined lengths, which also may be of substantially identical construction. Thanks to the modular construction of the conveyor 10 any number of frame sections 32, 34 and 36 may be interconnected to provide a conveyor of a length and configuration desired.

Figure 2:
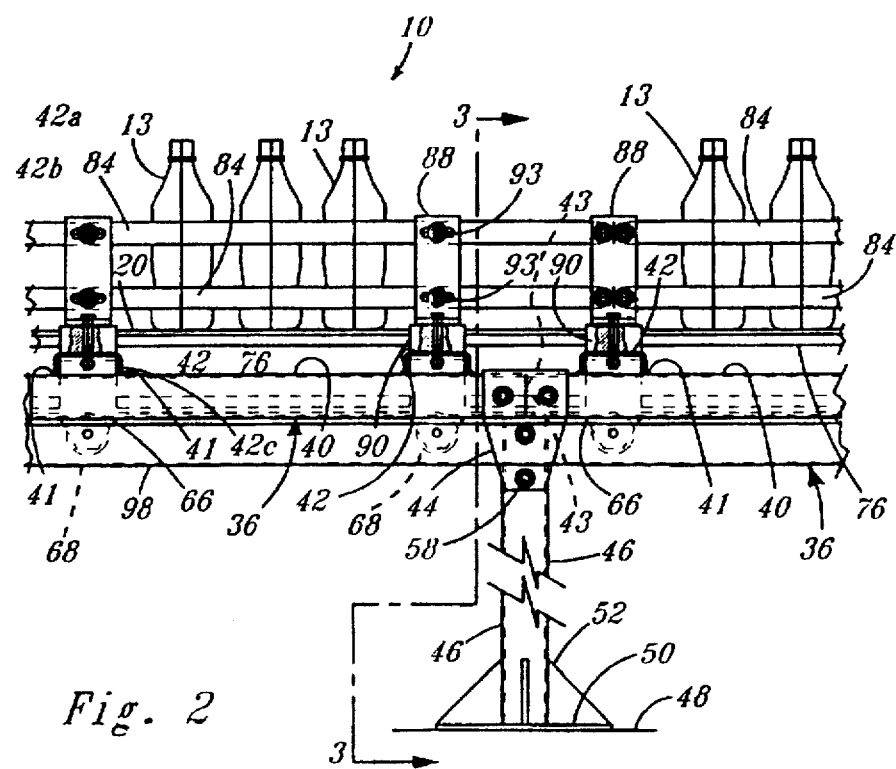
FIG. 2 is a detail side elevation of the conveyor shown in FIG. 1.

The frame sections 32, 34 and 36 are of unique construction which will now be described in conjunction with FIGS. 2 and 3, in particular. Referring to FIGS. 2 and 3, each frame section 36 is characterized by two spaced-apart, elongated longitudinal beam members 40 which comprise rectangular or square cross section metal tubes. The longitudinal beam members 40 are interconnected by transverse beam members 42 which are mounted above the beam members 40. The beam members 42 comprise inverted U-shaped or so-called channel type members, respectively. The beam members 42 each have a center web 42a and opposed depending flanges 42b and 42c. As shown in FIG. 2, the transverse beam members 42 are spaced apart also along the length of the longitudinal beam members 40 and are connected to the beam members 40 by welds 41. Alternatively, the beams 40 and 42 may be interconnected by suitable fasteners, not shown. A transverse beam member 42 is disposed adjacent an end 43 of each beam member 42 a sufficient distance to provide for the disposition of a connector member 44. A beam connector member 44 is connected to an end of each longitudinal beam member 42 of a frame section 36 for interconnecting the frame sections 36 with each other. Connectors 44 are also operable to connect each frame section 36 with a frame section 32 or 34, for example. The beam connectors 44 are also operable to connect the frame sections 32, 34 and 36 to upstanding support columns 46 which may also be made of rectangular or square cross section metal tubing. Each support column 46 may, for example, be adapted to support the frame sections, 32, 34 and 36 at their respective joints and be disposed on a floor surface 48, FIG. 2, by a transverse support flange 50 suitably welded to one end of the column member 46 and including plural reinforcing gussets 52.

Referring further to FIGS. 2 and 3, the connector members 44 each have spaced apart depending arm portions 54 interconnected by a transverse web 56. The cooperating arm portions 54 are adapted to be clamped to the opposed ends of the beams 40 and the support columns 46 by respective bolt and nut assemblies 58, as shown. Accordingly, a connector member 44 and support column 46 may be disposed at an end of each of the beams 40 as well as at the ends of the beams making up the frame sections 32 and 34 so that each frame section may be easily connected to its adjacent frame section and supported by column members 46.

Referring further to FIG. 3, each of the transverse frame members 42 supports opposed, depending, somewhat L-shaped or so-called angle support members 66 which are operable to support therebetween elongated chain support rollers 68. Each roller 68 has opposed trunnions 70 which are journalled in suitable bores formed in depending legs 67 of the support members 66, respectively. The support members 66 may be suitably secured to the beams 42 by mechanical fasteners 69 or by welding.

Referring further to FIGS. 2 and 3, the transverse beams 42 also support spaced apart longitudinal guide and support rails 74 for the article transport run 21a of the conveyor flights 20 and 22. The support rails 74 are formed of a suitable self-lubricating plastic such as one of the fluorocarbon plastics or nylon, for example. Each support rail 74 has a suitable metal backing member 76 secured thereto and operable to be supported on the beams 42e by suitable fasteners, including fasteners 69, as shown. The support rails 74 are spaced apart sufficiently to permit respective hinge bosses 25 and 27 of the chain links 24 to slide between parallel pairs of the support rails, as shown in FIG. 3. Each chain link 24 is secured to its adjacent chain link by a suitable hinge pin, not shown, extending between the bosses 25 and journalled by the boss 27 of an adjacent chain link.

As further shown in FIGS. 2 and 3, each conveyor section 36 is also provided with respective sets of opposed conveyor side guide rails 82, not shown in FIG. 1, which may also be formed of a suitable somewhat self-lubricating plastic such as a fluorocarbon or nylon material and supported by a backing member 84 which may be a metal such as aluminum or stainless steel. The guide rails 82 are supported on suitable spaced apart upstanding support brackets 88, which may be somewhat L-shaped and have base legs 89 supported on the beams 42 by respective support blocks 90. The blocks 90 may be formed of plastic or metal and the assembly of the support brackets 88 and the support blocks 90 may be secured to the beams 42 by suitable threaded fastener assemblies 94, see FIG. 3. The somewhat L-shaped support brackets 88 may also be connected directly to the beams 42 but the overall height of the support rails with respect to the chain links 24 may be adjusted by substituting different height support blocks, not shown, for the support blocks 90 without modifying each of the support brackets 88.

FIG. 4 shows a detail of a preferred manner of securing the guide rails 82 to the support brackets 88. A suitable counterbore 83 is formed in the surface 85 of each guide rail 82 at spaced apart points, coinciding with the location of the brackets 88, for receiving a hex head or, preferably, socket head type bolt 87 therein and operable to be secured to the bracket 88 by a conventional hex nut 91. Accordingly, the guide surface 85 of the rail 82 is a substantially smooth surface which will not mar the articles being transported along the conveyor 10. The chain flight support rails 74 are, in like manner, secured to the beams 42 by similar socket head fasteners disposed in or flush with suitable counterbores, not shown, formed in the support surfaces 75, FIG. 3, of the guide rails 74.

FIG. 3 also shows the disposition of an elongated collection tray and guard 98 supported by the conveyor frame sections, such as the frame section 36 illustrated. The tray 98 is characterized by an elongated channel member having opposed upstanding flanges 99 which are provided with suitable bores to provide for engagement with the trunnions 70, as shown, for supporting the tray between the spaced apart columns 46. The tray 98 serves as collection means for debris from articles transported by the conveyor 10 and as a guard to minimize unwanted contact with the return runs of the conveyor flights 20 and 22 which are supported by the rollers 68. Those skilled in the art will appreciate from viewing FIGS. 2 and 3 that, by mounting the transverse beam or frame members 42 above the longitudinal beam frame members 40, easier access to the upper transport runs 21a and lower return runs 21b of the conveyor flights 20, 22 is obtainable by washdown hoses, not shown, which may be manipulated by maintenance personnel. Moreover, if desired, the tray 98 may be easily removed from the working position shown in FIG. 3 by spreading the flanges 99 to remove the tray from the trunnions 70 so that the rollers 68 may be accessed for further cleaning and service and the return runs 21b of the chain links 24 may also be accessed for cleaning and service.

As shown in FIG. 2, each of the support brackets 88 is of a suitable width such that the fastener receiving openings formed therein for the fastener assemblies 87, 91 are characterized as elongated slots 93. The opposed ends of the guide rails 82, 84 may be dimensioned such that they terminate half-way the width of a bracket 88 adjacent to an end 43 of a beam 40 so that a continuous length of guide rail may be provided and secured at spaced apart points, including its opposed ends, to selected ones of the support brackets 88.

Referring now to FIG. 5, a curved corner frame section 32 is illustrated in plan view. The frame section 32 is connected to straight or linear frame sections 16 and 36 using the same connector members 44 and column members 46 disposed at respective opposed corners or ends 102, 104, 106 and 108 of longitudinal outer and inner radius beams 108 and 109. The beam ends 102 and 106 are at opposite ends of the outer radius beam 108 which is made up of metered beam sections 110, 112 and 114 having the same cross sectional configuration as the longitudinal beams 40. The inner radius beam 109 is spaced from the beam 108 and is made up of interconnected beam sections 118, 120 and 122, which are also metered to form the inner radius beam as illustrated. The beam sections 110, 112 and 114 are suitably welded to each other at their mating ends and the beam sections 118, 120 and 122 are also suitably welded to each other at their mating ends, respectively. The beams 108 and 109 are interconnected by above or top mounted, spaced apart transverse beams 124, 126, 128, 130 and 132 which have the same cross-sectional configuration as the beams 42 and are cut to length to form transverse end surfaces to coincide with the outer surfaces of the beams 108 and 109. The beams 124, 126, 128, 130 and 132 may be secured to the beams 108 and 109 by suitable welds, not shown.

Accordingly, a corner frame section 32 or 34 of the conveyor 10 may be made up of the same longitudinal and transverse beam configurations as the straight sections 36, 16 or 28, for example. The chain flights 20 and 22 are supported on the corner frame sections 32 in the same manner as they are supported on the straight frame sections 36. The guide and support rails 74 may be bent along suitable radii to form a smooth curved change of direction of the conveyor flights 20 and 22 and the guide rails 82 may also be supported on respective support brackets 88 and bent to radii of curvature suitable to contain articles such as beverage bottles 13, FIG. 2, on the conveyor for transport therealong by the chain flights 20 and 22. The tray 98 may also be suitably modified for traversing the corner sections 32 and 34. The radius of curvature of the chain flights 20 and 22 is, of course, determined by the configuration of the chain links and may be determined by the minimum radius of curvature at which these links can operate satisfactorily.

The construction and operation of the conveyor 10 is believed to be readily understandable to those of ordinary skill in the art from the foregoing description of the conveyor and the respective frame sections 32 and 36, for example. The construction materials for the beams 40 and 42 may be aluminum or stainless steel, for example, if the conveyor is used in the food and beverage processing industry. Alternatively, certain composite or plastic materials may be used for these beams. The support columns 46 may also be made of the same material as the longitudinal beams 40, by way of example. The guide rails 74 and 82, as previously mentioned, may be made of suitable self-lubricating plastic materials. In particular, the guide and support rails 74 should be made of a material which is compatible with the material of the chain links 24 so that a low co-efficient friction and minimal wear occurs between the chain links and the support rails. By way of example, it is indicated that a conveyor having chain flights 20 and 22 of about 7.5 inches width, each, may have an overall width of about twenty-three inches when using longitudinal beams 40 of two inch square cross section metal tubing and transverse beam members of one inch by two inch aluminum or steel channel. The beam members 42 may be formed of plate stock and folded to provide the respective opposed flanges and connecting web forming the channel shaped cross section. The width of the support rails 74 and 82 is preferably about 1.0 inches for the corresponding frame dimensions hereinabove. The height of the brackets 88 from the plane of the web of the beams 42 may be between 6.0 inches and 7.0 inches.

Figure 6:
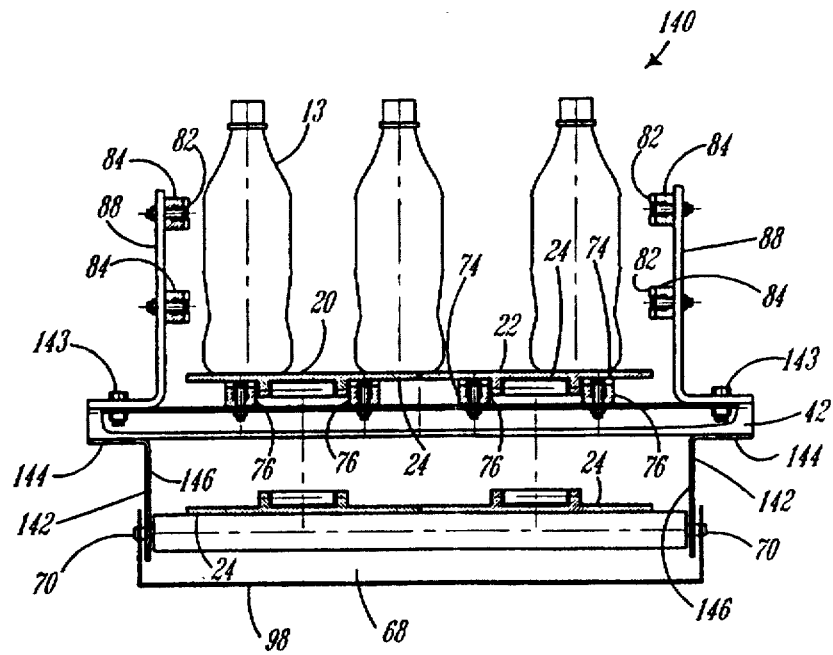
FIG. 6 is a section view, taken along line 6—6 of FIG. 7, of an alternate embodiment of a conveyor in accordance with the invention.
Figure 7:
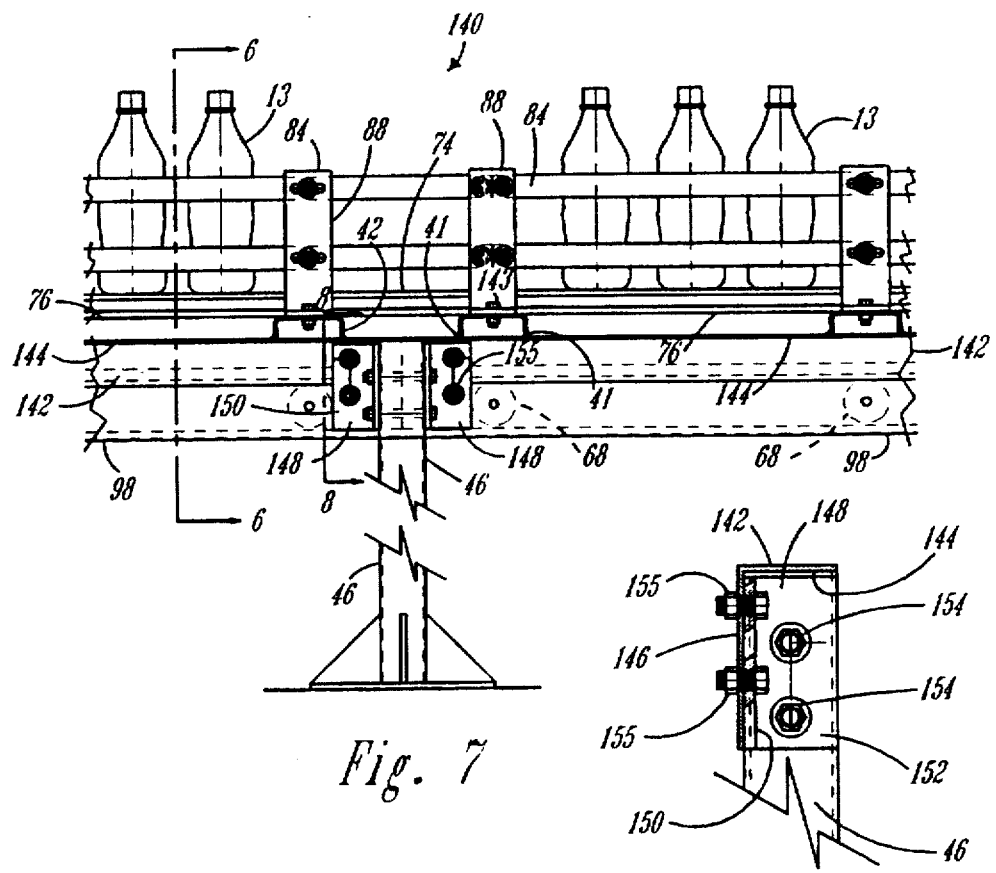
FIG. 7 is a detail side elevation of the alternate embodiment of the conveyor.

Referring now to FIGS. 6 and 7, in particular, an alternate embodiment of a conveyor apparatus in accordance with the invention is illustrated and generally designated by the numeral 140. The conveyor apparatus 140 is similar in many respects to the conveyor apparatus 10 except for the provision of the longitudinal frame or beam members which are characterized by spaced apart elongated angle or L-shaped members 142. The frame members 142 have opposed flanges 144 and 146 which support the transverse beam or frame members 42 and the rollers 68, respectively. The beams 42 may be welded to the beams 142 in a manner similar to the embodiment of FIGS. 1 through 5, and the brackets 88 may be secured to the beams 42 by fasteners 143, FIG. 6. With the arrangement of the conveyor apparatus 140, the support brackets 66 may be eliminated. Suitable openings are provided in the depending flange portions 146 of the frame members 142 to support the trunnions 70 of the rollers 68, as shown in FIG. 6.

Figure 8:
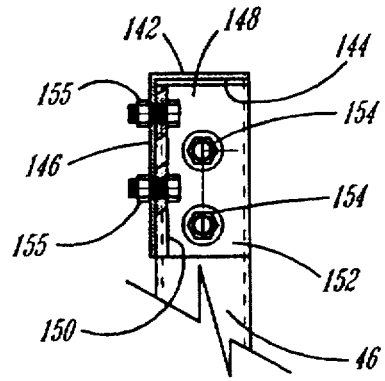
FIG. 8 is a detail view taken from line 8—8 of FIG. 7 showing a connector between a column member and a longitudinal beam member.

As shown in FIGS. 7 and 8, the column members 46 may be secured to opposed ends of respective longitudinal beam or frame members 142 by respective angle or L-shaped connector members 148. The connector members 148 have opposed flanges 150 ad 152 which are coplanar with the beam flanges 146 and the sidewalls of the column members 46, respectively. The column members 46 are secured to the beam members 142 by suitable bolt and nut assemblies 154 and 155, FIG. 8, respectively.

Figure 9:
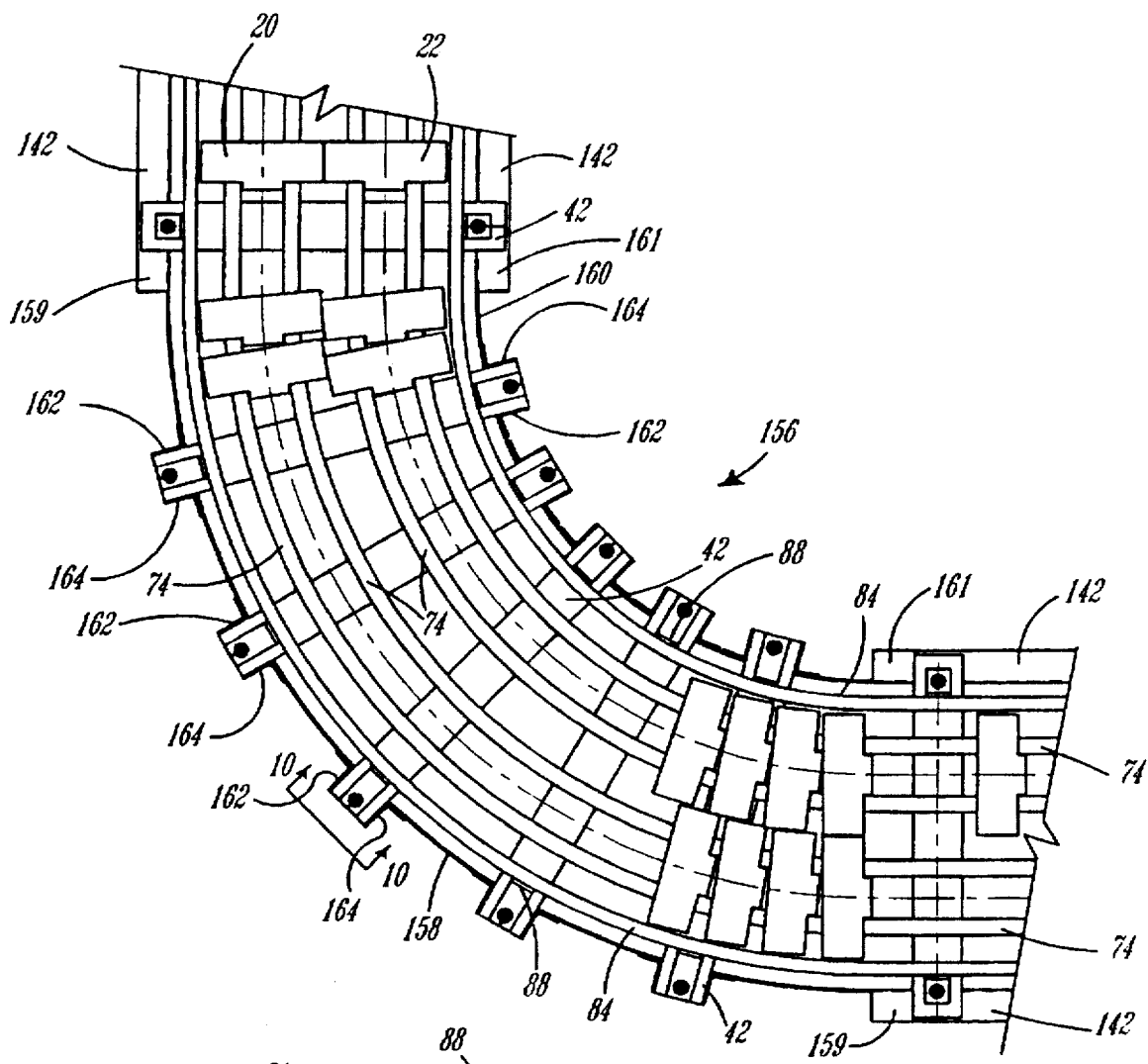
FIG. 9 is a plan view of a corner or curved section of the alternate embodiment.
Figure 10:
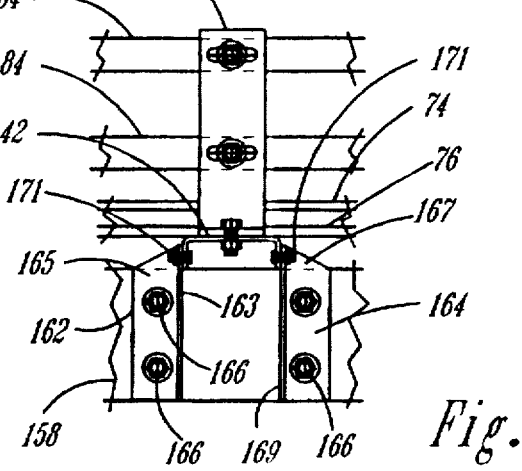
FIG. 10 is a detail view taken generally from the line 10—10 of FIG. 9.

Referring to FIGS. 9 and 10, there is illustrated a curved or corner conveyor section 156 corresponding to the curved or corner sections 32 and 34. The corner section 156 is made up of opposed longitudinal beam members 158 and 160 comprising outer and inner radius members, respectively, and which are preferably continuously curved throughout a major portion of their length. The longitudinal beam or frame members 158 and 160 are preferably formed of planar metal plate. Alternatively, the longitudinal beams could be formed of miter cut angle, tube or other beam cross sectional configurations. Opposite ends of the beams 158 and 160 are provided with short transverse flanges 159 and 161, FIG. 9. The beams 158 and 160 support respective transverse beam members 42 thereabove which preferably lie along respective equally spaced apart radius lines of the radius of curvature of the corner section 156, as illustrated. As shown in FIG. 10 by way of example, the beam member 158 is secured to the transverse beam members 42 by opposed angle or L-shaped connectors 162 and 164 which have opposed flanges 163, 165 and 167, 169 which are suitably fastened to the beam members 158 and 42 by suitable, respective bolt and nut assemblies 166 and 171, as illustrated. Accordingly, the conveyor 140 enjoys all of the benefits of the conveyor 10 and is of somewhat simplified construction in that the longitudinal beam or frame members 142, 158 and 160 are adapted to support the top or above mounted transverse beam members 42 as well as the rollers 68. Moreover, the beam members may be secured to the support columns 46 by the connectors 150. The materials of construction of the conveyor apparatus 140 may, of course, be substantially the same as that of the conveyor 10.

Those skilled in the art will further recognize from the above-mentioned description that the conveyors 10 and 140 may be fabricated relatively easy, are of uncomplicated construction, may be easily erected using any number of straight and curved or corner sections, for example. The curved or corner section 34 may be identical to the curved or corner section 32. Those skilled in the art will also recognize that the conveyors 10 and 140 may be more easily cleaned by high pressure water hoses and the like in environments where frequent cleaning is required, such as in the food and beverage processing industries. The uncomplicated construction of the conveyors 10 and 140 is advantageous for many reasons indicated above and which will be apparent to those of skill in the art.

Although preferred embodiments of a conveyor in accordance with the invention have been described in some detail herein, those skilled in the art will also recognize that various substitutions and modifications may be made without departing from the scope and spirit of the appended claims.

What is claimed is:

1. In a conveyor apparatus including endless chain means for conveying articles between one end of said conveyor apparatus and another end of said conveyor apparatus, a frame for supporting said endless chain means comprising:

two, spaced apart, elongated longitudinal beams;

plural spaced apart transverse beams disposed above and engaged with said longitudinal beams, respectively, and interconnecting said longitudinal beams;

a plurality of longitudinal, spaced apart guide and support rails for said endless chain means, said guide and support rails extending substantially parallel to said longitudinal beams and supported on said transverse beams; and a plurality of generally vertical support columns supporting said longitudinal beams, respectively, each of said support columns being connected to at least one of said longitudinal beams by a connector member engaged with said at least one said longitudinal beam and with said support column.

2. The conveyor apparatus set forth in claim 1 wherein: said transverse beams comprise inverted channel members having a web portion and spaced apart depending flanges.

3. The conveyor apparatus set forth in claim 1 including: spaced apart brackets depending from said transverse beams and support roller means interposed between said brackets and operable to support a return run of said endless chain means.

4. The conveyor apparatus set forth in claim 1 including:

a plurality of opposed spaced apart upstanding brackets supported on said transverse beams; and elongated parallel side guide rails supported on said brackets for guiding articles being conveyed along said apparatus by said endless chain means.

5. The conveyor apparatus set forth in claim 1 wherein: said endless chain means comprise plural chain links, each having a generally planar deck portion and depending hinge portions, respectively, said chain links being interconnected with each other to form said endless chain means.

6. The conveyor apparatus set forth in claim 1 wherein: said connector member includes opposed depending arms and a connecting web between said arms, said arms being operable to be secured to said support column and said longitudinal beams by respective fastener means.

7. The conveyor apparatus set forth in claim 1 wherein: said connector member comprises an angle member having opposed flanges operable to be secured to said support column and said longitudinal beams by respective fastener means.

8. The conveyor apparatus set forth in claim 1 wherein: said longitudinal beams include sections which are interconnected, respectively, at respective angles to form a corner section of said frame.

9. In a conveyor apparatus including endless chain means for conveying articles between one end of said conveyor apparatus and another end of said conveyor apparatus, a frame for supporting said endless chain means comprising:

two, spaced apart, elongated longitudinal beams, each comprising an angle cross section member;

plural spaced apart transverse beams interconnecting said longitudinal beams and mounted above said longitudinal beams; and a plurality of longitudinal, spaced apart guide and support rails for said endless chain means, said guide and support rails extending substantially parallel to said longitudinal beams and supported by said transverse beams.

10. The conveyor apparatus set forth in claim 9 including: support roller means for supporting a return run of said endless chain means and supported by said angle members.

11. In a tabletop conveyor apparatus including at least one conveyor flight of endless tabletop conveyor chain comprising interconnected chain links, a frame for supporting said conveyor flight characterized by:

a plurality of interconnected frame sections;

each of said frame sections comprising two spaced apart longitudinal beams;

a plurality of spaced apart transverse beams extending above and between said longitudinal beams and connected to said longitudinal beams, said transverse beams comprising elongated channel members;

a plurality of spaced apart parallel extending guide and support rails disposed on and supported by said transverse beams for guiding and supporting thereon said chain links of said conveyor flight;

spaced apart, generally vertically extending support columns for supporting said longitudinal beams, said support columns being disposed at adjacent abutting ends of said longitudinal beams of two respective adjacent frame sections; and connector members for connecting the longitudinal beams of each of said adjacent frame sections to each other and to said support columns, respectively, said connector members each including opposed portions operable to be secured to said column member and said longitudinal beams by removable fastener means, respectively.

12. In a conveyor apparatus including endless chain means for conveying articles between one end of said conveyor apparatus and another end of said conveyor apparatus, a frame for supporting said endless chain means comprising:

spaced apart, elongated longitudinal beams substantially continuously curved to form a corner section of said frame;

plural spaced apart transverse beams extending between and supported above said longitudinal beams;

a plurality of longitudinal, spaced apart guide and support rails for said endless chain means, said guide and support rails being supported on said transverse beams; and connector means for connecting said transverse beams to said longitudinal beams at respective opposite ends of said transverse beams, said connector means comprising opposed members having, respectively, opposed flanges engageable with a longitudinal beam and a transverse beam, respectively, for securing said transverse beams to said longitudinal beams.

13. In a conveyor apparatus including endless chain means for conveying articles between one end of said conveyor apparatus and another end of said conveyor apparatus, a frame for supporting said endless chain means comprising:

two, spaced apart, elongated longitudinal beams, each comprising a rectangular cross section tubular member;

plural spaced apart transverse beams interconnecting said longitudinal beams and mounted above said longitudinal beams; and a plurality of longitudinal, spaced apart guide and support rails for said endless chain means, said guide and support rails extending substantially parallel to said longitudinal beams and supported by said transverse beams.

14. In a tabletop conveyor apparatus including at least one flight of endless tabletop conveyor chain comprising interconnected chain links, a frame for supporting said flight characterized by:

a plurality of interconnected frame sections;

each of said frame sections comprising two spaced apart longitudinal beams;

a plurality of spaced apart transverse beams extending between and above said longitudinal beams and connected to said longitudinal beams;

a plurality of spaced apart generally parallel extending guide and support rails disposed on and supported by said transverse beams for guiding and supporting thereon said chain links of said flight;

spaced apart, generally vertically extending support columns for supporting said longitudinal beams, said support columns being disposed at adjacent abutting ends of said longitudinal beams of two respective adjacent frame sections; and connector means for connecting the longitudinal beams of each of said adjacent frame sections to each other and to said support columns, respectively.

15. The conveyor apparatus set forth in claim 14 wherein:

said connector means comprise respective connector members including opposed depending arms and a connecting web interconnecting said arms and journalling said longitudinal beams, at said abutting ends, said arms being secured to said support column by removable fastener means.

16. The conveyor apparatus set forth in claim 14 wherein:

said connector means comprise opposed angle members having respective opposed flanges secured to said support columns and said longitudinal beams, respectively, by removable fastener means.

17. The conveyor apparatus set forth in claim 14 wherein:

said longitudinal beams include sections which are interconnected, respectively, at respective angles to form a corner section of said frame.

18. The conveyor apparatus set forth in claim 14 including:

spaced apart brackets depending from said transverse beams and support roller means interposed between said brackets and operable to support a return run of said conveyor chain.

19. The conveyor apparatus set forth in claim 14 wherein:

said longitudinal beams comprise elongated angle members having opposed flanges, one of said flanges supporting said transverse beams and the other of said flanges supporting spaced apart support roller means interposed between said longitudinal beams and operable to support a return run of said conveyor chain.

20. The conveyor apparatus set forth in claim 14 including:

a plurality of opposed spaced apart upstanding brackets supported on said transverse beams; and elongated parallel guide rails supported on said brackets for guiding articles being conveyed along said apparatus.

21. In a conveyor apparatus including an endless flexible conveyor having opposed conveyor runs, a frame for supporting said conveyor runs comprising:

a plurality of interconnected frame sections, each of said frame sections comprising two spaced apart longitudinal beams;

a plurality of spaced apart transverse beams extending between and above said longitudinal beam and connected to said longitudinal beams;

elongated support rail means disposed on and supported by said transverse beams for supporting one run of said conveyor means;

spaced apart, generally vertically extending support columns for supporting said longitudinal beams, said support columns being disposed at adjacent abutting ends of said longitudinal beams of two respective adjacent frame sections; and connector means for connecting the longitudinal beams of each of said adjacent frame sections to each other and to said support columns, respectively.

* * * * *